United States Patent
Bouiller et al.

(10) Patent No.: US 7,488,112 B2
(45) Date of Patent: Feb. 10, 2009

(54) ASSEMBLY ARRANGEMENT BETWEEN A BEARING INNER RACE AND A JOURNAL, RACE AND JOURNAL SUITABLE FOR SUCH AN ARRANGEMENT, AND TURBOMACHINE FITTED THEREWITH

(75) Inventors: Philippe Pierre Vincent Bouiller, Samoreau (FR); Gilles Alain Marie Charier, La Grande Paroisse (FR); Daniel Georges Plona, Vulaines sur Seine (FR)

(73) Assignee: Snecma, Paris (FR)

( * ) Notice: Subject to any disclaimer, the term of this patent is extended or adjusted under 35 U.S.C. 154(b) by 323 days.

(21) Appl. No.: 11/402,974

(22) Filed: Apr. 13, 2006

(65) Prior Publication Data

US 2006/0233479 A1   Oct. 19, 2006

(30) Foreign Application Priority Data

Apr. 15, 2005   (FR) ................... 05 50962

(51) Int. Cl.
*F16C 43/04* (2006.01)
*F16C 13/04* (2006.01)

(52) U.S. Cl. .................. 384/561; 384/543; 384/598
(58) Field of Classification Search .................. 384/538, 384/544, 561, 564, 569–570, 583–586, 903, 384/475, 543, 554, 598
See application file for complete search history.

(56) References Cited

U.S. PATENT DOCUMENTS

| 3,635,103 | A | * | 1/1972 | Monti | 475/346 |
| 3,985,458 | A | | 10/1976 | Snyder, Jr. | |
| 4,334,720 | A | * | 6/1982 | Signer | 384/475 |
| 4,384,749 | A | * | 5/1983 | Schaefer | 384/465 |
| 4,858,427 | A | * | 8/1989 | Provenzano | 60/39.08 |
| 5,183,342 | A | | 2/1993 | Daiber et al. | |
| 5,494,358 | A | * | 2/1996 | Dougherty | 384/448 |
| 5,685,650 | A | | 11/1997 | Martinie et al. | |
| 5,746,517 | A | * | 5/1998 | Durham et al. | 384/538 |

FOREIGN PATENT DOCUMENTS

| EP | 0 359 659 B1 | | 4/1993 |
| GB | 2 382 386 A | | 5/2003 |
| JP | 05172217 A | * | 7/1993 |

* cited by examiner

*Primary Examiner*—Marcus Charles
(74) *Attorney, Agent, or Firm*—Oblon, Spivak, McClelland, Maier & Neustadt, P.C.

(57) ABSTRACT

An assembly arrangement between an inner race of a bearing and a journal supported in rotation in this bearing includes a journal annular groove and a race annular groove which interact to form an annular channel when they are placed opposite one another. The assembly further includes a retaining ring placed in the annular channel, which prevents a relative movement in translation between the journal and the inner race. The assembly also includes at least one recess of the journal and at least one tooth of the inner race, which interact to prevent a relative movement in rotation between the journal and the inner race.

25 Claims, 2 Drawing Sheets

ASSEMBLY ARRANGEMENT BETWEEN A BEARING INNER RACE AND A JOURNAL, RACE AND JOURNAL SUITABLE FOR SUCH AN ARRANGEMENT, AND TURBOMACHINE FITTED THEREWITH

FIELD OF THE INVENTION

The present invention relates to the assembly between an inner race of a bearing and a journal guided in rotation by this bearing.

It is aimed at an assembly arrangement making it possible to assemble the inner race and the journal.

It is aimed at a bearing inner race suitable for such an assembly arrangement, and a journal suitable for such an assembly arrangement.

Finally it is aimed at a turbomachine fitted with such a bearing inner race and/or such a journal and/or fitted with such an assembly arrangement.

BACKGROUND OF THE INVENTION

In all of the following, the term "journal" will be used which must be understood as being any similar part or belonging to a rotating shaft.

FIGS. 2 and 3 illustrate, schematically and in axial section, respectively two known arrangements of the assembly between a journal and a bearing inner race. In these two examples, the bearing is a roller bearing.

"Axial section" means a section taken along the longitudinal axis of the journal. In these two figures, similar elements bear similar reference numbers.

Reference number 102 indicates a journal having an axis 104. The journal 102 is supported by a bearing having a bearing inner race 106 and a bearing outer race 108. Between the bearing inner race 106 and the bearing outer race 108 there are rollers 110. The bearing outer race is attached to a fixed part 112. The bearing inner race 106 is attached to the journal 102.

FIG. 2 illustrates an assembly arrangement in which the bearing inner race 106 is attached to an end of the journal 102 by means of a weld 116.

The bearing inner race 106 forms here an extension of the journal 102. In other words, this configuration is similar to a configuration in which the rollers 110 would be directly incorporated into the journal 102.

Such an assembly arrangement by welding has disadvantages. Specifically, the bearing inner race 106 and the journal 102 are made of different materials. It is often difficult to make a firm weld between two parts made of different materials. In addition, when such a weld is made, the lifetime of the assembly is not always satisfactory.

FIG. 3 illustrates an assembly arrangement in which the bearing inner race 106 is mounted by being clamped axially against a shoulder 118 of the journal 102, and attached by means of a clamping nut 120. An anti-rotation device 122 associated with the clamping nut 120 prevents rotation of the latter relative to the journal 102.

Such a mechanical assembly by clamping nut does not have the disadvantage specific to an assembly by welding. However it has another disadvantage linked to the bulk of the assembly. Specifically, in turbomachines designed to receive such assemblies, it is increasingly necessary to limit the axial length of the journal or of the rotating shaft. The presence of the clamping nut 120 and its anti-rotation device 122 placed at the end of the journal 102 beyond the bearing inner race 106, requires the axial length of the journal 102 to be greater than the axial length of a journal 102 suitable for an assembly by welding.

An object of the present invention is to provide an assembly arrangement of an inner race and a journal that does not have the aforementioned disadvantages.

More precisely, an object of the present invention is to provide an assembly arrangement that is mechanical and that does not require an increase in the axial length of the journal.

In everything that follows, the "bearing inner race", respectively the "bearing outer race", will simply be called "inner race", respectively "outer race".

SUMMARY OF THE INVENTION

According to a first aspect, the invention relates to an assembly arrangement between an inner race of a bearing and a journal supported in rotation in this bearing, the journal having an axis. This bearing arrangement comprises:
  a journal annular groove made on an outer face of the journal and a race annular groove made on an inner face of the inner race, the two annular grooves interacting to form an annular channel between the journal and the inner face when they are placed opposite one another,
  a retaining ring placed in the annular channel, which prevents a relative movement, in translation along the axis of the journal, between the journal and the inner race, and
  at least one recess of the said journal and at least one tooth of the said inner race, which interact to prevent a relative movement, in rotation about the axis of the journal, between the journal and the inner race.

Each tooth extends radially inwards from the inner face of the inner race.

The at least one recess may be a blind hole of the journal. The at least one recess may be a longitudinal groove of the journal.

Preferably, the assembly arrangement comprises at least one opening connecting the race annular groove to an outer face of the inner race.

Preferably, the retaining ring is furnished with a split to make it easier to insert in the annular channel.

Preferably, the journal annular groove and the at least one recess are placed either side of at least one oil duct which opens onto an outer face of the journal and which carries oil to the inner race through the journal.

In addition, the assembly arrangement comprises a bevel of the inner race, in the vicinity of the race annular groove.

Optionally, the assembly arrangement comprises a race radial shoulder and a journal radial shoulder which interact to produce an axial abutment of the inner race on the journal.

According to a second aspect, the invention relates to a bearing inner race suitable for an assembly arrangement between this inner race and a journal, according to a first aspect of the invention. The journal has an axis. This race comprises:
  a race body designed to interact with a bearing outer race,
  a first race end comprising first race assembly means to prevent a relative movement, in translation along the axis of the journal, between the journal and the inner race, and
  a second race end comprising second race assembly means for preventing a relative movement, in rotation about the axis of the journal, between the journal and the inner race.

The first race assembly means comprise a race annular groove made on an inner face of the inner race.

The first race assembly means also comprise a bevel made at the extremity of the first race end, on an inner face of the inner race and in the vicinity of the race annular groove.

The first race assembly means also comprise at least one opening connecting the race annular groove to an outer face of the inner race.

The second race assembly means comprise at least one tooth extending radially inwards at the extremity of the second race end.

Optionally, the bearing inner race comprises a race radial shoulder between the race body and the first race end.

According to a third aspect, the invention relates to a journal suitable for an assembly arrangement between this inner race and a journal, according to the first aspect of the invention. The journal has an axis. It comprises:

first journal assembly means for preventing a relative movement, in translation along the axis of the journal, between the journal and the inner race, and second journal assembly means for preventing a relative movement, in rotation about the axis of the journal, between the journal and the inner race.

The first journal assembly means comprise a journal annular groove made on an outer face of the journal.

The second journal assembly means comprise at least one recess made in the journal.

Each recess may be, for example, a blind hole of the journal, or else a longitudinal groove of the journal.

Optionally, the journal comprises a journal radial shoulder.

Preferably, the journal comprises at least one oil duct which opens onto an outer face of the said journal between the said first journal assembly means and the said second journal assembly means.

According to a fourth aspect, the invention relates to a turbomachine, in particular an aircraft engine, fitted with an assembly arrangement according to the first aspect, or with a bearing inner race according to the second aspect, or with a journal according to the third aspect.

The assembly arrangement according to the invention is particularly suitable when the user desires to assemble an inner race on a journal towards an end of the latter. It is of particular value when the desire is to reduce the axial dimension of the journal. This is particularly the case when the end of the journal is close to another part and the user desires to prevent any collision or any contact between them during the operation of the turbomachine.

BRIEF DESCRIPTION OF THE DRAWINGS

The invention will be better understood on reading the following detailed description of embodiments of the invention, given as illustrations and in no way limiting, with reference to the appended drawings, in which.

DESCRIPTION OF PREFERRED EMBODIMENTS

Figure 1:
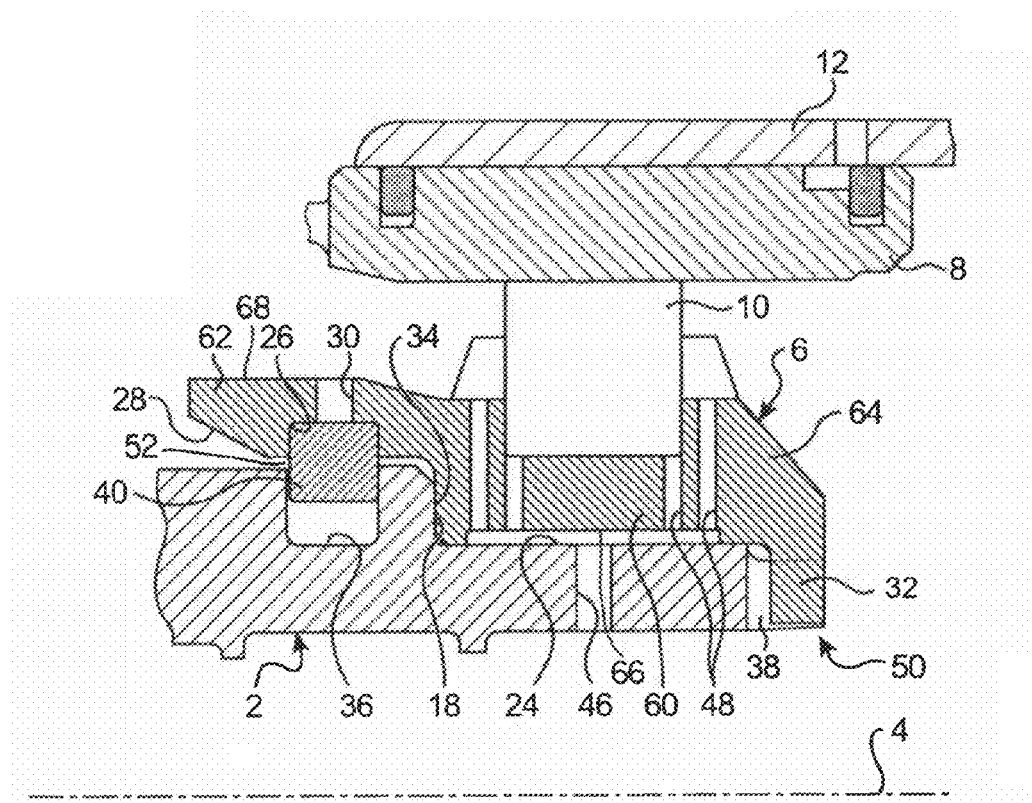
FIG. 1 illustrates schematically and in axial section an embodiment of an assembly arrangement between an inner race and a journal, according to the invention.
Figure 2:
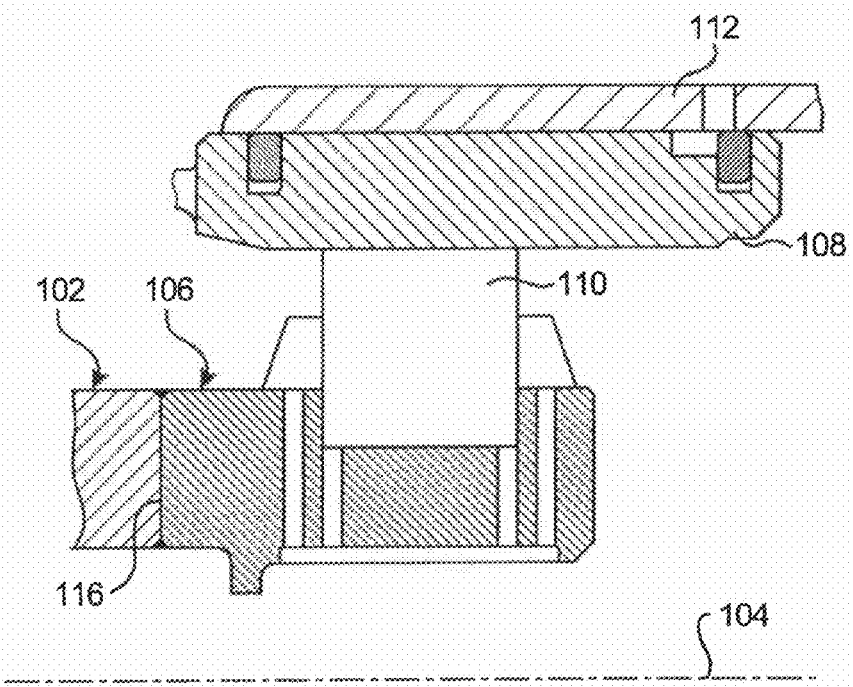
FIG. 2, already described, illustrates schematically and in axial section a first known assembly arrangement between an inner race and a journal.
Figure 3:
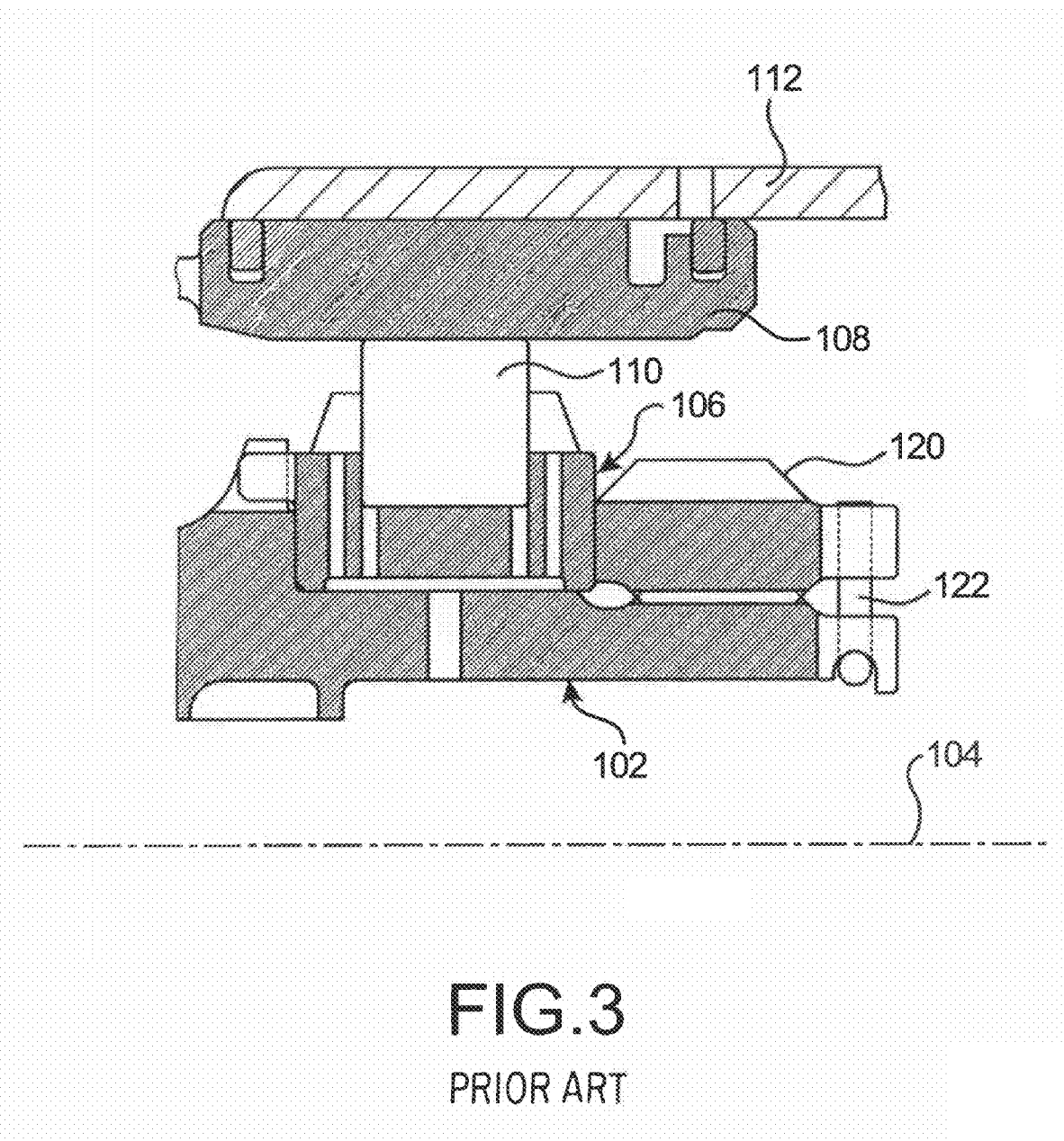
FIG. 3, already described, illustrates schematically and in axial section a second known assembly arrangement between an inner race and a journal.

With reference to FIG. 1, an assembly arrangement is shown according to the invention. A journal 2 having an axis 4 is supported in rotation by a bearing which comprises an inner race 6 and an outer race 8. In the example illustrated, the bearing is a roller bearing, and rollers 10 are placed between the outer race 8 and the inner race 6.

The bearing outer race 108 is attached to a fixed part 12.

The inner race 6 comprises a race body 60, which interacts with the outer race 8 via the rollers 10 to provide the rolling action. It also comprises a first race end 62 and a second race end 64, which are annular parts extending either side of the race body 60 in the axial direction. It further comprises a race inner face 66 and a race outer face 68.

The journal 2 comprises an axis 4, a journal outer face 24 and a journal end 50.

The journal 2 and the inner race 6 are assembled together by means of first race assembly means 26, 28, 30, second race assembly means 32, first journal assembly means 36, second journal assembly means 38 and additional assembly means 40.

The first race assembly means 26, 28, 30 comprise a race annular groove 26 made on the race inner face 66, at the first race end 62.

The first race assembly means 26, 28, 30 also comprise a bevel 28 made on the race inner face 66, at the extremity of the first race end 62 and in the vicinity of the race annular groove 26.

The first race assembly means 26, 28, 30 further comprise at least one opening 30 which traverses the inner race 6 radially. Each opening 30 connects the race annular groove 26 and the race outer face 68. When several openings 30 are present, they can be distributed radially on the inner race 6.

The second race assembly means 32 comprise at least one tooth 32, extending radially inwards from the race inner face 66 at the second race end 64. It may be a single tooth 32 or a plurality of teeth 32 substantially distributed over a circumference of the race inner face 66, for example equidistant from one another.

The first journal assembly means 36 comprise a journal annular groove 36 made on the journal outer face 24.

The second journal assembly means 38 comprise at least one recess 38 of the journal 2. This may be a single recess 38, or else a plurality of recesses 38 substantially distributed over a circumference of the journal outer face 24, for example equidistant from one another.

Each recess 38 may be, for example, a blind hole machined in the journal 2, or else a longitudinal groove machined in the journal 2.

Optionally, the inner race comprises a race shoulder 34 extending radially between the race body 60 and the first race end 62, and the journal comprises a journal shoulder 18 extending radially. In the example illustrated, the race shoulder 34 extends radially inwards and the journal shoulder 18 extends radially outwards.

The assembly arrangement comprises additional assembly means 40 which comprise a retaining ring 40.

When the assembly between the inner race 6 and the journal 2 is made, the race inner face 66 is opposite the journal outer face 24.

When the assembly between the inner race 6 and the journal 2 is made, each tooth 32 and the inner race 6 are engaged with a corresponding recess 38 of the journal 2. Thanks to the interaction of the teeth 32 and the recesses 38, the inner race 6 and the journal 2 are prevented from moving in axial rotation relative to one another.

When the assembly between the inner race 6 and the journal 2 is made, the race annular groove 26 and the journal annular groove 36 interact to form an annular channel 52 into which the retaining ring 40 is inserted. Thanks to the interaction between the retaining ring 40 and the annular channel 52, the inner race 6 and the journal 2 are prevented from moving in axial translation relative to one another.

In addition, the journal 2 is furnished with at least one journal oil duct 46, placed between the journal annular groove 36 and the at least one recess 38, which opens onto the journal outer face 24 in order to carry oil to the inner race 6 through the journal 2. Equally, the inner race 6 is furnished with race oil ducts 48, which traverse it radially, in order to carry oil to the rollers 10.

Mounting the assembly arrangement comprises the two operations described below.

During a first operation, the retaining ring 40 is inserted into the journal annular groove 36. Preferably, the retaining ring 40 is furnished with a split (not shown) to make it easier to insert in the journal annular groove 36. This split may be oriented in the radial direction of the retaining ring 40, or it may be oblique to this radial direction.

During a second operation, the inner race 6 is inserted onto the journal 2 via the journal end 50. The presence of the bevel 28 on the inner race 6 makes it easier to engage the inner race 6 over the retaining ring 40.

When the inner race 6 and the journal 2 are furnished with respective shoulders 34 and 18, the latter are in contact against one another and serve as axial abutment to the inner race 6 on the journal 2 in the direction of insertion.

In operation, the rotation causes an expansion of the retaining ring 40 which presses against the race annular groove 26.

Dismantling the assembly arrangement comprises the following operation: the retaining ring 40 is retracted from the journal annular groove 36 by means of an appropriate tool. For example, a tool, comprising pins or lugs that penetrate into the openings 30 of the inner race 6 and push out the retaining ring 40, may be used. Simultaneously, the inner race 6 is withdrawn from the journal 2 in the direction of the journal end 50.

We claim:

1. An assembly arrangement between an inner race of a bearing and a journal supported in rotation in said bearing, said journal having an axis, wherein said assembly arrangement comprises:
    a journal annular groove made on an outer face of said journal and a race annular groove made on an inner face of said inner race, said two annular grooves interacting to form an annular channel between said journal and said inner face when the two annular grooves are placed opposite one another,
    a retaining ring placed in said annular channel, which prevents a relative movement, in translation along said axis, between said journal and said inner race, and
    at least one recess of said journal and at least one tooth of said inner race, which interact to prevent a relative movement, in rotation about said axis, between said journal and said inner race.

2. An assembly arrangement according to claim 1, wherein each tooth extends radially inwards from the inner face of the inner race.

3. An assembly arrangement according to claim 1, wherein each recess consists of a blind hole of the journal.

4. An assembly arrangement according to claim 1, wherein each recess consists of a longitudinal groove of the journal.

5. An assembly arrangement according to claim 1, further comprising at least one opening connecting said race annular groove to an outer face of said inner race.

6. An assembly arrangement according to claim 1, wherein said retaining ring includes a split oriented so as to facilitate insertion of said retaining ring in said annular channel.

7. An assembly arrangement according to claim 1, wherein said journal annular groove and said at least one recess are placed either side of at least one oil duct which opens onto an outer face of the journal and carries oil to said inner race through said journal.

8. An assembly arrangement according to claim 1, further comprising a bevel of the inner race, in the vicinity of the race annular groove.

9. An assembly arrangement according to claim 1, further comprising a race radial shoulder and a journal radial shoulder, which interact to produce an axial abutment of said inner race on said journal.

10. An assembly arrangement according to claim 1 wherein said inner race comprises:
    a race body designed to interact with a bearing outer race,
    a first race end comprising first race assembly means for preventing a relative movement, in translation along the said axis, between said journal and said inner race, and
    a second race end comprising second race assembly means for preventing a relative movement, in rotation about said axis, between said journal and said inner race.

11. An assembly arrangement according to claim 10, wherein said first race assembly means comprise a race annular groove made on an inner face of said inner race.

12. An assembly arrangement according to claim 11, wherein the first race assembly means comprise a bevel made at the extremity of said first race end, on an inner face of said inner race and in the vicinity of said race annular groove.

13. An assembly arrangement according to claim 10, wherein said first race assembly means comprise at least one opening connecting said race annular groove to an outer face of the said inner race.

14. An assembly arrangement according to claim 10, wherein said second race assembly means comprise at least one tooth extending radially inwards at the extremity of the second race end.

15. An assembly arrangement according to claim 10, further comprising a race radial shoulder between the race body and the first race end.

16. A turbomachine comprising the bearing, the journal, and the assembly arrangement according to claim 10, wherein the assembly arrangement is between the inner race of the bearing and the journal is supported in rotation in said bearing.

17. An assembly arrangement according to claim 1 wherein said journal comprises:
    first journal assembly means for preventing a relative movement, in translation along the said axis, between said journal and said inner race, and
    second journal assembly means for preventig a relative movement, in rotation about said axis, between said journal and said inner race.

18. An assembly arrangement according to claim 17, wherein said first journal assembly means comprise a journal annular groove made on an outer face of said journal.

19. An assembly arrangement according to claim 17, wherein said second journal assembly means comprising at least one recess made in said journal.

20. An assembly arrangement according to claim 19, wherein each recess consist in a blind hole of the journal.

21. An assembly arrangement according to claim 19, wherein each recess consists of a longitudinal groove of the journal.

22. An assembly arrangement according to claim 17, further comprising a journal radial shoulder configured to interact with a race radial shoulder to produce an axial abutment of said inner race on said journal.

23. An assembly arrangement according to claim 17, further comprising at least one oil duct which opens onto an outer face of said journal, said oil duct being placed between said first journal assembly means and said second journal assembly means.

24. A turbomachine comprising the bearing, the journal, and the assembly arrangement according to claim 17, wherein the assembly arrangement is between the inner race of the bearing and the journal is supported in rotation in said bearing.

25. A turbomachine comprising the bearing, the journal, and the assembly arrangement according to claim 1, wherein the assembly arrangement is between the inner race of the bearing and the journal is supported in rotation in said bearing.

* * * * *